(12) United States Patent
Tung et al.

(10) Patent No.: US 11,024,034 B2
(45) Date of Patent: Jun. 1, 2021

(54) IMAGE SEGMENTATION CONFIDENCE DETERMINATION

(71) Applicant: ACIST Medical Systems, Inc., Eden Prairie, MN (US)

(72) Inventors: Jonathan Tung, Cupertino, CA (US); Jung W Suh, Palo Alto, CA (US); Advit Bhatt, Danville, CA (US)

(73) Assignee: ACIST MEDICAL SYSTEMS, INC., Eden Prairie, MN (US)

(*) Notice: Subject to any disclaimer, the term of this patent is extended or adjusted under 35 U.S.C. 154(b) by 71 days.

(21) Appl. No.: 16/581,577

(22) Filed: Sep. 24, 2019

(65) Prior Publication Data

US 2021/0004965 A1    Jan. 7, 2021

Related U.S. Application Data

(60) Provisional application No. 62/869,793, filed on Jul. 2, 2019.

(51) Int. Cl.
*G06K 9/00* (2006.01)
*G06T 7/12* (2017.01)
*G06K 9/62* (2006.01)

(52) U.S. Cl.
CPC .............. *G06T 7/12* (2017.01); *G06K 9/6218* (2013.01); *G06T 2207/10132* (2013.01); *G06T 2207/30101* (2013.01)

(58) Field of Classification Search
CPC combination set(s) only.
See application file for complete search history.

(56) References Cited

U.S. PATENT DOCUMENTS 3,918,025 A    11/1975  Koshikawa
4,347,443 A     8/1982  Whitney
(Continued)

FOREIGN PATENT DOCUMENTS

CN    101208045 A    6/2008
CN    103025247 A    4/2013
(Continued)

OTHER PUBLICATIONS

Cardinal, M. et al., "Intravascular Ultrasound Image Segmentation: A Fast-Marching Method," (2003), Springer, Berlin, Heidelberg 032548 XP055299068, vol. 2879, pp. 432-439.
(Continued)

*Primary Examiner* — Iman K Kholdebarin
(74) *Attorney, Agent, or Firm* — Fredrikson & Byron, P.A.

(57) ABSTRACT

Examples for determining a confidence level associated with image segmentation are disclosed. A confidence level associated with a collective image segmentation result can be determined by generating multiple individual segmentation results each from the same image data. These examples can then aggregate the individual segmentation results to form the collective image segmentation result and measure the spread of each individual segmentation result from the collective image segmentation result. The measured spread of each individual segmentation result can then be used to determine the confidence level associated with the collective image segmentation result. This can allow a confidence level associated with the collective image segmentation result to be determined. This confidence level may be determined without needing a ground truth to compare to the collective image segmentation result.

20 Claims, 5 Drawing Sheets

(56) References Cited

U.S. PATENT DOCUMENTS

| | | | |
|---|---|---|---|
| 4,850,363 A | 7/1989 | Yanagawa | |
| 4,860,758 A | 8/1989 | Yanagawa et al. | |
| 4,949,310 A | 8/1990 | Smith et al. | |
| 5,070,734 A | 12/1991 | Kawabuchi et al. | |
| 5,131,396 A | 7/1992 | Ishiguro et al. | |
| 5,183,048 A | 2/1993 | Eberle | |
| 5,203,338 A | 4/1993 | Jang | |
| 5,361,767 A | 11/1994 | Yukov | |
| 5,363,849 A | 11/1994 | Suorsa et al. | |
| 5,396,285 A | 3/1995 | Hedberg et al. | |
| 5,453,575 A | 9/1995 | O'Donnell et al. | |
| 5,462,057 A | 10/1995 | Hunt et al. | |
| 5,531,679 A | 7/1996 | Schulman et al. | |
| 5,690,115 A | 11/1997 | Feldman | |
| 5,741,552 A | 4/1998 | Takayama et al. | |
| 5,795,296 A | 8/1998 | Pathak et al. | |
| 5,833,615 A | 11/1998 | Wu et al. | |
| 5,848,969 A | 12/1998 | Panescu et al. | |
| 5,876,343 A | 3/1999 | Teo | |
| 5,885,218 A | 3/1999 | Teo et al. | |
| 5,921,931 A | 7/1999 | O'Donnell et al. | |
| 6,015,385 A | 1/2000 | Finger et al. | |
| 6,036,650 A | 3/2000 | Wu et al. | |
| 6,095,976 A | 8/2000 | Nachtomy et al. | |
| 6,132,374 A | 10/2000 | Hossack et al. | |
| 6,139,501 A | 10/2000 | Roundhill et al. | |
| 6,154,572 A | 11/2000 | Chaddha | |
| 6,216,025 B1 | 4/2001 | Kruger | |
| 6,277,075 B1 | 8/2001 | Torp et al. | |
| 6,561,980 B1* | 5/2003 | Gheng | A61B 8/12 600/443 |
| 6,589,181 B2 | 7/2003 | Grunwald et al. | |
| 6,645,147 B1 | 11/2003 | Jackson et al. | |
| 6,771,803 B1* | 8/2004 | Turek | G06T 7/12 382/131 |
| 7,194,294 B2 | 3/2007 | Panescu et al. | |
| 7,691,061 B2 | 4/2010 | Hirota | |
| 7,925,064 B2 | 4/2011 | Cloutier et al. | |
| 9,292,918 B2 | 3/2016 | Zagrodosky et al. | |
| 9,761,006 B2 | 9/2017 | Koninklijke | |
| 9,858,668 B2 | 1/2018 | Jones et al. | |
| 10,089,755 B2 | 10/2018 | Griffin et al. | |
| 10,231,712 B2 | 3/2019 | Ebbini et al. | |
| 10,258,304 B1* | 4/2019 | Kiraly | A61B 5/7267 |
| 10,383,602 B2* | 8/2019 | Cho | A61B 8/5215 |
| 10,542,954 B2 | 1/2020 | Spencer et al. | |
| 2001/0017941 A1 | 8/2001 | Chaddha | |
| 2001/0029336 A1 | 10/2001 | Teo | |
| 2003/0015037 A1 | 1/2003 | Stephans et al. | |
| 2003/0063787 A1 | 4/2003 | Natanzon et al. | |
| 2003/0078497 A1 | 4/2003 | Ji et al. | |
| 2003/0097069 A1 | 5/2003 | Avinash et al. | |
| 2003/0103212 A1 | 6/2003 | Westphal et al. | |
| 2003/0191392 A1 | 10/2003 | Haldeman | |
| 2003/0208123 A1 | 11/2003 | Panescu | |
| 2004/0030250 A1 | 2/2004 | Stewart | |
| 2004/0037164 A1 | 2/2004 | Garlick et al. | |
| 2004/0199047 A1 | 10/2004 | Taimisto et al. | |
| 2005/0119573 A1 | 6/2005 | Vilenkin et al. | |
| 2005/0215897 A1 | 9/2005 | Sakaguchi et al. | |
| 2005/0249391 A1 | 11/2005 | Kimmel et al. | |
| 2006/0253028 A1 | 11/2006 | Lam et al. | |
| 2007/0016068 A1 | 1/2007 | Grunwald et al. | |
| 2007/0036404 A1 | 2/2007 | Li | |
| 2007/0100239 A1 | 5/2007 | Nair et al. | |
| 2007/0167710 A1 | 7/2007 | Unal et al. | |
| 2007/0201736 A1 | 8/2007 | Klingensmith et al. | |
| 2008/0015569 A1 | 1/2008 | Saadat et al. | |
| 2008/0031498 A1 | 2/2008 | Corcoran et al. | |
| 2008/0043024 A1 | 2/2008 | Schiwietz et al. | |
| 2008/0075375 A1 | 3/2008 | Unal | |
| 2008/0177183 A1 | 7/2008 | Courtney et al. | |
| 2008/0200815 A1 | 8/2008 | Van Der Steen et al. | |
| 2008/0234582 A1 | 9/2008 | Nair et al. | |
| 2009/0088830 A1 | 4/2009 | Mohamed et al. | |
| 2009/0105579 A1 | 4/2009 | Garibaldi | |
| 2009/0284332 A1 | 11/2009 | Moore et al. | |
| 2010/0010344 A1 | 1/2010 | Ahn et al. | |
| 2010/0094127 A1 | 4/2010 | Xu | |
| 2010/0174190 A1 | 7/2010 | Hancock et al. | |
| 2010/0312092 A1 | 12/2010 | Maurice et al. | |
| 2010/0312109 A1 | 12/2010 | Satoh | |
| 2011/0071404 A1 | 3/2011 | Schmitt et al. | |
| 2011/0160586 A1 | 6/2011 | Li et al. | |
| 2011/0182517 A1* | 7/2011 | Farsiu | A61B 5/7203 382/190 |
| 2011/0196237 A1 | 8/2011 | Pelissier et al. | |
| 2011/0257527 A1 | 10/2011 | Suri | |
| 2012/0022360 A1 | 1/2012 | Kemp | |
| 2012/0065511 A1 | 3/2012 | Jamello, III | |
| 2012/0123271 A1 | 5/2012 | Cai | |
| 2012/0170848 A1 | 7/2012 | Kemp et al. | |
| 2012/0224751 A1 | 9/2012 | Kemp et al. | |
| 2013/0109968 A1 | 5/2013 | Azuma | |
| 2013/0296693 A1 | 11/2013 | Wenzel et al. | |
| 2013/0303907 A1 | 11/2013 | Corl | |
| 2013/0303910 A1 | 11/2013 | Hubbard et al. | |
| 2013/0317359 A1 | 11/2013 | Wilson et al. | |
| 2014/0099011 A1 | 4/2014 | Begin | |
| 2014/0100440 A1 | 4/2014 | Cheline et al. | |
| 2014/0180078 A1 | 6/2014 | Nair | |
| 2014/0180083 A1 | 6/2014 | Hoseit | |
| 2014/0180108 A1 | 6/2014 | Rice | |
| 2014/0257087 A1 | 9/2014 | Elbasiony et al. | |
| 2014/0268167 A1 | 9/2014 | Friedman et al. | |
| 2014/0270445 A1 | 9/2014 | Kemp | |
| 2014/0276065 A1 | 9/2014 | He et al. | |
| 2014/0316758 A1 | 10/2014 | Yagi et al. | |
| 2014/0350404 A1 | 11/2014 | Rajguru et al. | |
| 2014/0355850 A1* | 12/2014 | Kelm | G06T 7/0012 382/128 |
| 2015/0073279 A1 | 3/2015 | Cai et al. | |
| 2015/0099975 A1 | 4/2015 | Lam et al. | |
| 2015/0141832 A1 | 5/2015 | Yu et al. | |
| 2015/0235360 A1* | 8/2015 | Zheng | G06K 9/4604 382/128 |
| 2015/0245776 A1 | 9/2015 | Hirohata et al. | |
| 2015/0356734 A1 | 12/2015 | Ooga et al. | |
| 2016/0007967 A1 | 1/2016 | Johnson et al. | |
| 2016/0022248 A1 | 1/2016 | Mori et al. | |
| 2016/0206290 A1 | 7/2016 | Itoh et al. | |
| 2016/0300350 A1* | 10/2016 | Choi | G06N 7/005 |
| 2017/0035394 A1 | 2/2017 | Maeda | |
| 2017/0100100 A1 | 4/2017 | Jamello et al. | |
| 2017/0119242 A1* | 5/2017 | Jia | G06T 7/11 |
| 2017/0164825 A1* | 6/2017 | Chen | G01N 21/47 |
| 2017/0178325 A1* | 6/2017 | Ye | G06T 11/008 |
| 2017/0193658 A1 | 7/2017 | Cardinal et al. | |
| 2017/0224286 A1 | 8/2017 | Sakamoto | |
| 2017/0301089 A1 | 10/2017 | Lam et al. | |
| 2017/0330331 A1* | 11/2017 | Bhatt | G06T 7/223 |
| 2018/0042575 A1 | 2/2018 | Moore et al. | |
| 2019/0082117 A1 | 3/2019 | Moore et al. | |
| 2020/0082525 A1* | 3/2020 | Xu | A61B 6/4014 |
| 2020/0226422 A1* | 7/2020 | Li | G06N 3/08 |
| 2020/0320659 A1* | 10/2020 | Whiting | G06T 7/12 |

FOREIGN PATENT DOCUMENTS

| | | |
|---|---|---|
| EP | 346889 A1 | 12/1989 |
| EP | 851241 A2 | 7/1998 |
| EP | 1387317 A1 | 2/2004 |
| EP | 1988505 A1 | 11/2008 |
| EP | 1609423 B2 | 3/2010 |
| EP | 2488107 A2 | 8/2012 |
| JP | 62221335 A | 9/1987 |
| JP | H9000522 A | 1/1997 |
| JP | 2001333902 A | 12/2001 |
| JP | 2002530143 A | 9/2002 |
| JP | 2004180784 A | 7/2004 |
| JP | 2006014938 A | 1/2006 |
| JP | 2007029520 A | 2/2007 |
| JP | 2007512862 A | 5/2007 |
| JP | 2007175542 A | 7/2007 |

(56) References Cited

FOREIGN PATENT DOCUMENTS

| JP | 2007229015 A | 9/2007 |
|---|---|---|
| JP | 2008508970 A | 3/2008 |
| JP | M08536638 A | 9/2008 |
| JP | 2009504329 A | 2/2009 |
| JP | 2009545406 A | 12/2009 |
| JP | 4648652 B2 | 3/2011 |
| JP | 2013507227 A | 3/2013 |
| JP | 2015104463 A | 6/2015 |
| WO | 0101864 A1 | 1/2001 |
| WO | 2006015877 A1 | 2/2006 |
| WO | 2006102511 A2 | 9/2006 |
| WO | 2006113857 A1 | 10/2006 |
| WO | 2006122001 A2 | 11/2006 |
| WO | 2007098209 A2 | 8/2007 |
| WO | 2008016992 A1 | 2/2008 |
| WO | 2008110013 A1 | 9/2008 |
| WO | 2011046903 A2 | 4/2011 |
| WO | 2014186268 A1 | 11/2014 |
| WO | 2017062265 A1 | 4/2017 |
| WO | 2017100274 A1 | 6/2017 |

OTHER PUBLICATIONS

Chalana, V. et al., "A Methodology for Evaluation of Boundary Detection Algorithms on Medical Images," IEEE Transactions on Medical Imaging, (Oct. 5, 1997) vol. 16, No. 5, pp. 643-645.

PCT International Search Report and Written Opinion dated Aug. 17, 2020 for related International Application No. PCT/US2020/040421, 12 pages.

Dumane et al., "Use of Frequency Diversity and Nakagami Statistics in Ultrasonic Tissue Characterization," IEEE Transactions on Ultrasonics, Ferroelectrics, and Frequency Control, vol. 48, No. 5, Sep. 2001, pp. 1139-1146.

Foster, "Transducer Materials and Probe Construction," Ultrasound in Medicine and Biology, vol. 26, Supp. 1, 2000, pp. S2-S5.

Frijlink et al., "High Frequency Harmonic Imaging in Presence of Intravascular Stents," IEEE Ultrasonics Symposium, 2003, pp. 208-211.

Garcia-Garcia et al., "Imaging of coronary atherosclerosis: intravascular ultrasound," European Heart Journal, vol. 3, 2010, pp. 2456-2469.

Waters et al., "Development of a High-Definition Intravascular Ultrasound Imaging System and Catheter," IEEE International Ultrasonics Symposium Proceedings, Oct. 18, 2011, 4 pages.

Seo et al., "Sidelobe Suppression in Ultrasound Imaging Using Dual Apodization with Cross-Correlation," IEEE Transactions on Ultrasonics, Ferroelectrics, and Frequency Control, vol. 55, No. 10, Oct. 2008, pp. 2198-2210.

Shankar et al., "Computer-Aided Classification of Breast Masses in Ultrasonic B-Scans Using a Multiparameter Approach," IEEE Transactions on Ultrasonics, Ferroelectrics, and Frequency Control, vol. 50, No. 8, Aug. 2003, pp. 1002-1009.

Smith et al., "The Maltese Cross Processor: Speckle Reduction for Circular Transducers," Ultrasonic Imaging, vol. 10, No. 3, Jul. 1988, pp. 153-170.

U.S. Appl. No. 61/218,177, titled Vector Domain Image Enhancement for Mechanically Rotating Imaging Catheters, filed Jun. 18, 2009.

Van Der Steen et al., "IVUS Harmonic Imaging," Ultrasound in Medicine and Biology, vol. 26, Supp. 2, 2000, p. A90.

Wang et al., "Optimizing the Beam Pattern of a Forward-Viewing Ring-Annular Ultrasound Array for Intravascular Imaging," IEEE Transactions on Ultrasonics, Ferroelectrics, and Frequency Control, vol. 49, No. 12, Dec. 2002, pp. 1652-1664.

\* cited by examiner

FIG. 6

IMAGE SEGMENTATION CONFIDENCE DETERMINATION

RELATED APPLICATION

This application claims the benefit of U.S. Provisional Application No. 62/869,793 filed Jul. 2, 2019, the contents of which are hereby incorporated by reference.

TECHNICAL FIELD

This disclosure relates generally to image segmentation and, more particularly, to devices, systems, and methods for determining, and in some cases indicating, a confidence level associated with the image segmentation. Examples disclosed herein can be applied, for instance, in medical imaging.

BACKGROUND

Medical imaging techniques can be used to collect image data and generate in-vivo visualization of anatomical areas of interest. One such example is intravascular imaging, where vascular structures and lumens may be imaged. For instance, intravascular imaging may be used to produce one or more images of the coronary artery lumen, coronary artery wall morphology, and devices, such as stents, at or near the coronary artery wall. These images can be useful for diagnostic purposes, such as identifying diagnostically significant characteristics of a vessel.

However, information collected during medical imaging can include significant amounts of data, some of which may not be relevant to the purpose for which the imaging is being performed. Consequently, it may be useful to further analyze the image data collected during imaging so as to simplify image interpretation and automate identification of certain anatomic features and/or measurements of clinically useful parameters.

As one example, image segmentation may be used to simplify interpretation and automate identification and/or measurement of key features in the image data. Image segmentation can be used to partition an image, or set of images, into one or more regions of interest to facilitate the identification of relevant information in the image.

SUMMARY

Exemplary examples are described herein for determining a confidence level, such as a probability of error, associated with the result of image segmentation. Because in many applications the result of image segmentation can be used to facilitate meaningful decisions, it is important that the segmentation result be reliable. In the example of medical imaging, the result of image segmentation may be used to facilitate the identification of clinically relevant information and, as such, the reliability of the segmentation result can be important in accurately identifying the clinically relevant information. Accordingly, examples disclosed herein can estimate and provide a confidence level of a segmentation result so that a user may take the estimated confidence level into account when using the segmentation result.

Estimation of a confidence level of the segmentation result can be particularly helpful in autonomous segmentation. Manual segmentation of image data by a user can be tedious and time-consuming, so autonomous segmentation that carries out a segmentation operation on image data with no, or minimal, user input during execution can be desirable. However, autonomous segmentation may come with a level of uncertainty. Providing an estimated confidence level associated with the automated segmentation result can allow a user to be better informed when relying on the automated segmentation result.

Notably, examples disclosed herein can determine a confidence level associated with the result of image segmentation in applications where there is no ground truth to compare with the segmentation result. In many applications, image data is generated and segmented in order to determine one or more pieces of unknown information. As such, because the segmentation result may be the means by which the unknown information is ascertained, the lack of a known comparison point for the segmentation result can present a challenge in determining a confidence level associated with the segmentation result. Examples disclosed herein can solve this problem by determining a confidence level associated with the segmentation result without needing a ground truth to compare to the segmentation result. For example, in intravascular imaging, image data of a vessel wall, a vessel lumen, and plaque can be generated and segmented to ascertain the previously unknown boundary between the vessel wall and the vessel lumen. Because the boundary between the vessel wall and the lumen is unknown, examples disclosed herein can provide a segmentation result for such image data that includes a confidence level associated with the segmented boundary between the vessel wall and the lumen without using a known boundary between the vessel wall and the lumen to determine the confidence level.

In some examples disclosed herein, a confidence level associated with an image segmentation result can be determined by generating multiple individual segmentation results each from the same image data. These examples can then measure the spread of each individual segmentation result from a consensus of all segmentation results (e.g., from a collective segmentation result formed from the number of individual segmentation results). The measured spread of each individual segmentation result can then be used to determine the confidence level associated with the consensus, or collective, image segmentation result presented to a user. This can allow a confidence level associated with the consensus, or collective, segmentation result to be determined without needing a ground truth to compare to the consensus, or collective, segmentation result.

In one example, a method includes receiving, by a processor, an image comprising a cross-sectional view of an object. The method further includes, for each of a plurality of models, generating, by the processor and using the respective model, a boundary prediction for the object within the image, wherein each boundary prediction comprises a plurality of boundary prediction portions and each model of the plurality of models comprises a unique model. The method also includes generating, by the processor, and based on the boundary prediction for each model of the plurality of models, a clustered boundary prediction for the object within the image, the clustered boundary prediction comprising a plurality of clustered boundary prediction portions that each correspond to one of the plurality of boundary prediction portions of each of the boundary predictions. The method further includes, for each of the plurality of clustered boundary prediction portions, determining, by the processor, and based on a comparison between the respective clustered boundary prediction portion and the corresponding boundary prediction portions of the boundary predictions, a confidence level for the respective clustered boundary prediction portion. The method also includes outputting, by the processor and for display on a display device, a graphical indication for each of the plurality of clustered boundary prediction portions, wherein each clustered boundary prediction portion has a visual characteristic indicative of the confidence level for the respective clustered boundary prediction portion.

In another example, a computing device includes at least one processor and a storage component configured to store instructions. The instructions are executable by the at least one processor to receive an image comprising a cross-sectional view of an object. The instructions are further executable by the at least one processor to, for each of a plurality of models, generate, using the respective model, a boundary prediction for the object within the image, wherein each boundary prediction comprises a plurality of boundary prediction portions and each model of the plurality of models comprises a unique model. The instructions are also executable by the at least one processor to generate, based on the boundary prediction for each model of the plurality of models, a clustered boundary prediction for the object within the image, the clustered boundary prediction comprising a plurality of clustered boundary prediction portions that each correspond to one of the plurality of boundary prediction portions of each of the boundary predictions. The instructions are also executable by the at least one processor to, for each of the plurality of clustered boundary prediction portions, determine, and based on a comparison between the respective clustered boundary prediction portion and the corresponding boundary prediction portions of the boundary predictions, a confidence level for the respective clustered boundary prediction portion. The instructions are further executable by the at least one processor to output, for display on a display device, a graphical indication for each of the plurality of clustered boundary prediction portions, wherein each clustered boundary prediction portion has a visual characteristic indicative of the confidence level for the respective clustered boundary prediction portion.

In another example, a non-transitory computer-readable storage medium is described having stored thereon instructions that, when executed, cause one or more processors of a computing device to receive an image comprising a cross-sectional view of an object. The instructions further cause the one or more processors to, for each of a plurality of models, generate, using the respective model, a boundary prediction for the object within the image, wherein each boundary prediction comprises a plurality of boundary prediction portions and each model of the plurality of models comprises a unique model. The instructions also cause the one or more processors to generate, based on the boundary prediction for each model of the plurality of models, a clustered boundary prediction for the object within the image, the clustered boundary prediction comprising a plurality of clustered boundary prediction portions that each correspond to one of the plurality of boundary prediction portions of each of the boundary predictions. The instructions further cause the one or more processors to, for each of the plurality of clustered boundary prediction portions, determine, and based on a comparison between the respective clustered boundary prediction portion and the corresponding boundary prediction portions of the boundary predictions, a confidence level for the respective clustered boundary prediction portion. The instructions also cause the one or more processors to output, for display on a display device, a graphical indication for each of the plurality of clustered boundary prediction portions, wherein each clustered boundary prediction portion has a visual characteristic indicative of the confidence level for the respective clustered boundary prediction portion.

The details of one or more examples are set forth in the accompanying drawings and the description below. Other features, objects, and advantages will be apparent from the description and drawings.

BRIEF DESCRIPTION OF DRAWINGS

The following drawings are illustrative of particular examples of the present invention and therefore do not limit the scope of the invention. The drawings are intended for use in conjunction with the explanations in the following description. Examples of the invention will hereinafter be described in conjunction with the appended drawings, wherein like numerals denote like elements.

DETAILED DESCRIPTION

The following detailed description is exemplary in nature and provides some practical illustrations and examples. Those skilled in the art will recognize that many of the noted examples have a variety of suitable alternatives.

Examples disclosed herein can determine a confidence level associated with a result of image segmentation. In particular, examples disclosed herein can use multiple individual segmentation results each from the same image data. Such examples can apply the statistical nature of an ensemble process to estimate the confidence of segmentation performance by measuring the spread of each individual segmentation result from the consensus of all segmentation results (e.g., from a collective segmentation result formed from the number of individual segmentation results). This estimated confidence of the image segmentation result can provide users with additional information on how to use the segmentation result without knowing a ground truth.

Figure 1:
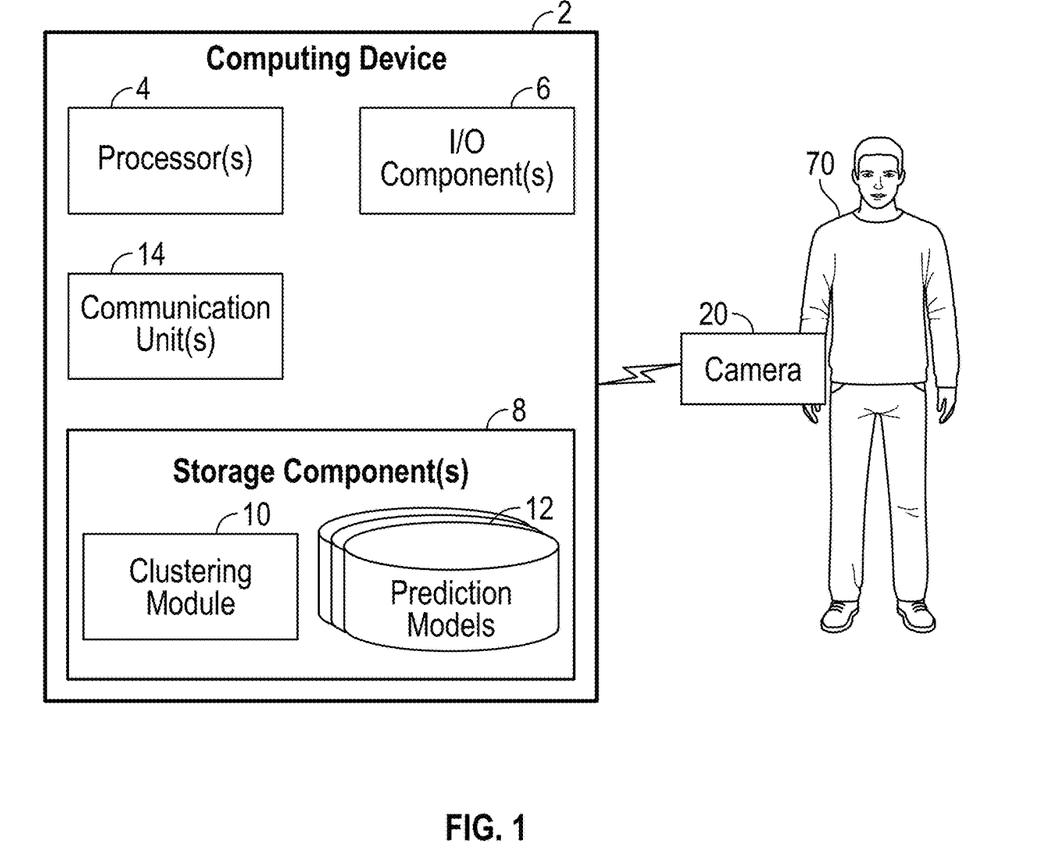
FIG. 1 is an example system including a camera configured to capture an image and a computing device configured to analyze the image in accordance with one or more of the techniques described herein.

FIG. 1 is an example system including a camera configured to capture an image and a computing device configured to analyze the image in accordance with one or more of the techniques described herein. FIG. 1 illustrates only one particular example of computing device 2, and many other examples of computing device 2 may be used in other instances and may include a subset of the components included in example computing device 2 or may include additional components not shown in FIG. 1. For instance, rather than being a separate component, camera 20 may be incorporated into computing device 2, or operatively connected in a manner other than a wireless connection.

As shown in the example of FIG. 1, computing device 2 includes one or more processors 4, one or more input/output (I/O) components 6, one or more communication units 14, and one or more storage components 8. Storage components 8 of computing device 2 include clustering module 10 and prediction models 12. For the purposes of this disclosure, prediction models may be similar to segmentation operations, wherein each model describes a different segmentation operation. Communication channels (not pictured) may interconnect each of the components 4, 6, 8, and 14 for inter-component communications (physically, communicatively, and/or operatively). In some examples, communication channels may include a system bus, a network connection, an inter-process communication data structure, or any other method for communicating data.

One or more communication units 14 of computing device 2 may communicate with external devices via one or more wired and/or wireless networks by transmitting and/or receiving network signals on the one or more networks. Examples of communication units 14 include a network interface card (e.g. such as an Ethernet card), an optical transceiver, a radio frequency transceiver, a GPS receiver, or any other type of device that can send and/or receive information. Other examples of communication units 14 may include short wave radios, cellular data radios, wireless network radios, as well as universal serial bus (USB) controllers. Communication units 14 may include a wireless interface configured to operate in accordance with a wireless protocol, such as WiFi®, Bluetooth®, or LTE.

One or more I/O components 6 may include input components that may receive input. Examples of input are tactile, audio, and video input. I/O components 6 of computing device 2, in one example, includes an intravascular ultrasound catheter, presence-sensitive input device (e.g., a touch sensitive screen, a PSD), mouse, keyboard, voice responsive system, video camera, microphone or any other type of device for detecting input from a human or machine. In some examples, I/O components 6 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

I/O components 6 may also include one or more output components that generate output. Examples of output are tactile, audio, and video output. I/O components 6 of computing device 2, in one example, includes a PSD, sound card, video graphics adapter card, speaker, cathode ray tube (CRT) monitor, liquid crystal display (LCD), or any other type of device for generating output to a human or machine.

One or more processors 4 may implement functionality and/or execute instructions associated with computing device 2. Examples of processors 4 include application processors, display controllers, auxiliary processors, one or more sensor hubs, and any other hardware configured to function as a processor, a processing unit, or a processing device. Module 10 and models 12 may be operable by processors 4 to perform various actions, operations, or functions of computing device 2. For example, processors 4 of computing device 2 may retrieve and execute instructions stored by storage components 8 that cause processors 4 to perform the operations of module 10 and models 12. The instructions, when executed by processors 4, may cause computing device 2 to store information within storage components 8.

One or more storage components 8 within computing device 2 may store information for processing during operation of computing device 2 (e.g., computing device 2 may store data accessed by module 10 and prediction models 12 during execution at computing device 2). In some examples, storage component 8 is a temporary memory, meaning that a primary purpose of storage component 8 is not long-term storage. Storage components 8 on computing device 2 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 8, in some examples, also include one or more computer-readable storage media. Storage components 8 in some examples include one or more non-transitory computer-readable storage mediums. Storage components 8 may be configured to store larger amounts of information than typically stored by volatile memory. Storage components 8 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 8 may store program instructions and/or information (e.g., data) associated with module 10 and prediction models 12. Storage components 8 may include a memory configured to store data or other information associated with module 10 and prediction models 12.

Camera 20 may be any image capture device capable of capturing an image of an object. In some instances, camera 20 may be an intravascular ultrasound catheter configured to capture an image that includes a cross-section of, e.g., the coronary artery of patient 70. However, in other instances, camera 20 may be any other type of camera configured to capture a cross-sectional image of an object. As such, though described throughout this disclosure as measuring the boundaries of an intravascular object after the capturing of an intravascular ultrasound image, the same techniques may be applied to any image where boundaries of an object within the image are to be defined. For instance, similar techniques may be applied to natural images (e.g., color images, grayscale images), different medical modality images (e.g., images captured through magnetic resonance imaging (MM), X-Ray, computed tomography (CT), positron emission tomography (PET), single-photon emission computed tomography (SPECT), and ultrasound), and non-natural images (e.g., thermal images, ultraviolet images). Further, while the techniques described herein are described with respect to cross-sectional areas, the same techniques could be applied to any object within an image where a boundary of such an object can be ascertained.

In accordance with the techniques of this disclosure, clustering module 10 may receive an image that includes a cross-sectional view of an object. Clustering module 10 may receive the image from a camera, such as camera 20. Camera 20 may be external to clustering module 10, where clustering module 10 receives the image via communication units 14. In other instances, camera 20 may be incorporated into computing device 2. The image may be any image that includes an object with known or unknown boundaries within the image, including cross-sections of objects. For instance, camera 20 may be an intravascular ultrasound device configured to capture an image of a vein or an artery of patient 70.

For each of a plurality of models, clustering module 10 may generate, using the respective model, a boundary prediction for the object within the image. A boundary prediction may also be referred to as an image segmentation or an individual segmentation result. Each model of the plurality of models may be a unique model. Further, each boundary prediction may include a plurality of boundary prediction portions. For instance, the plurality of models could include any type of machine learning or deep learning model, a pattern recognition model, a computer vision model, or a parameter-modified model, among other models. For example, support vector machine (SVM) models, UNet models, Random Forest models, and edge detection computer vision models, such as Sobel-filtering, and their variations with different parameters may be included in the plurality of models. Ultimately, the plurality of models may include upwards of nine or more distinct models, where each of the distinct models may be used to predict the boundary of an object within an image.

Clustering module 10 may generate, based on the boundary prediction for each model of the plurality of models, a clustered boundary prediction for the object within the image. The clustered boundary prediction may also be referred to as a collective segmentation result. Clustering module 10 may determine the clustered boundary prediction using ensembling techniques along with a clustering metric. In some instances, the clustering metric for the clustered boundary prediction may be a median of the individual image segmentation results (or corresponding boundary prediction portions of the boundary predictions). In some instances, the clustering metric for the clustered boundary prediction may be a mean boundary as averaged from each of the corresponding boundary prediction portions of the boundary predictions of the plurality of models. In other instances, the clustered boundary prediction may be a weighted clustered boundary prediction for the object within the image. For instance, clustering module 10 may, for each of the plurality of models, determine a weight for the respective model. Clustering module 10 may then generate, based on the corresponding boundary prediction portions of the boundary prediction and the weight for each model of the plurality of models, the weighted clustered boundary prediction by applying the weights to each of the boundary predictions and averaging the corresponding boundary prediction portions of the boundary predictions along with the weights.

The clustered boundary prediction may include a plurality of clustered boundary prediction portions that each correspond to one of the plurality of boundary prediction portions of each of the boundary predictions. For example, if each boundary prediction is broken into 100 boundary prediction portions, the clustered boundary prediction can likewise be broken into 100 clustered boundary prediction portions, with the corresponding portions having like locations with respect to the object within the image. For each of the plurality of clustered boundary prediction portions of the clustered boundary prediction, clustering module 10 may determine, based on a comparison between the respective clustered boundary prediction portions and corresponding boundary prediction portions of the boundary predictions, a confidence level for the respective clustered boundary prediction portion.

In some examples, in determining the confidence level, clustering module 10 may, for each of the plurality of models, determine, based on a comparison between the clustered boundary prediction portions and the corresponding boundary prediction portions of the boundary predictions, a spread for the respective model. One such example of the spread could be a z-score, although any measurement of a deviation between two values could be used for the purposes of the techniques described herein. Clustering module 10 may then determine, based on the spread for each of the corresponding boundary prediction portions of the boundary predictions, the confidence level for the respective clustered boundary prediction portion.

As defined in the nature of statistics, a z-score is equivalent to a number of standard deviations away from the mean a particular value is. Clustering module 10 may determine the z-score for the respective model by first creating, using the clustered boundary prediction portions and corresponding boundary prediction portions of the boundary predictions, a prediction distribution, such as the prediction distributions of FIGS. 4 and 5, with the clustered boundary prediction portions as a mean of the prediction distribution. This prediction distribution may be as simple as a dot plot along a line, or may be a more complex distribution, such as a bell curve. Clustering module 10 may then determine a standard deviation for the prediction distribution. The standard deviation may be calculated in accordance with typical rules of mathematics, or with proprietary adjustments to the typical algorithm for calculating a standard deviation. Clustering module 10 may then determine the z-score for each of the corresponding boundary prediction portions of the boundary predictions as a number of standard deviations away the respective corresponding boundary prediction portion is from the clustered boundary prediction portion.

In some instances, one or more of the models may produce results that are such an outlier that it is clear that the prediction of the model is erroneous for at least that clustered boundary prediction portion of the clustered boundary prediction. In practice, clustering module 10 may determine that a spread for a first corresponding boundary prediction portion of a first boundary prediction exceeds a deviation threshold for the prediction distribution, the first boundary prediction being associated with a first model of the plurality of models. In some examples, the deviation threshold may be a user-defined threshold, where other examples may include a default or pre-defined threshold. In response to making this determination, clustering module 10 may remove the first model from the plurality of models to generate a subset of models that includes every other model from the plurality of models except for the first model (e.g., the subset of models includes the non-outlier clustered boundary prediction portions of the other individual segmentation results). Clustering module 10 may then recalculate at least the respective clustered boundary prediction portion of the clustered boundary prediction using only the subset of models rather than allow the erroneous model to alter the results of the algorithm.

Clustering module 10 may output, for display on a display device, such as I/O components 6, a presentation of at least the collective segmentation result, the presentation including a graphical indication for each of the plurality of clustered boundary prediction portions of the clustered boundary prediction. Each clustered boundary prediction portion of the plurality of clustered boundary prediction portions has a visual characteristic, or a visual indicator, indicative of the confidence level for the respective clustered boundary prediction portion. The visual characteristic may be any distinguishing visual characteristic that may indicate a confidence level of the particular clustered boundary prediction portion in question. Examples of the visual characteristic include a line color, a fill pattern, a line weight, a line segmentation, a textual indication, a graphical icon, or any combination thereof. For instance when the visual characteristic includes a line color, an indication of green for a clustered boundary prediction portion of the clustered boundary prediction may indicate a high confidence level for that clustered boundary prediction portion of the clustered boundary prediction. Conversely, a clustered boundary prediction portion of the clustered boundary prediction with a low confidence level may be depicted as red in the output, while a portion of the clustered boundary prediction with a medium confidence level may be depicted as yellow. This may be a spectrum of colors, changing from the green spectrum to the red spectrum as the confidence level decreases.

Figure 2:
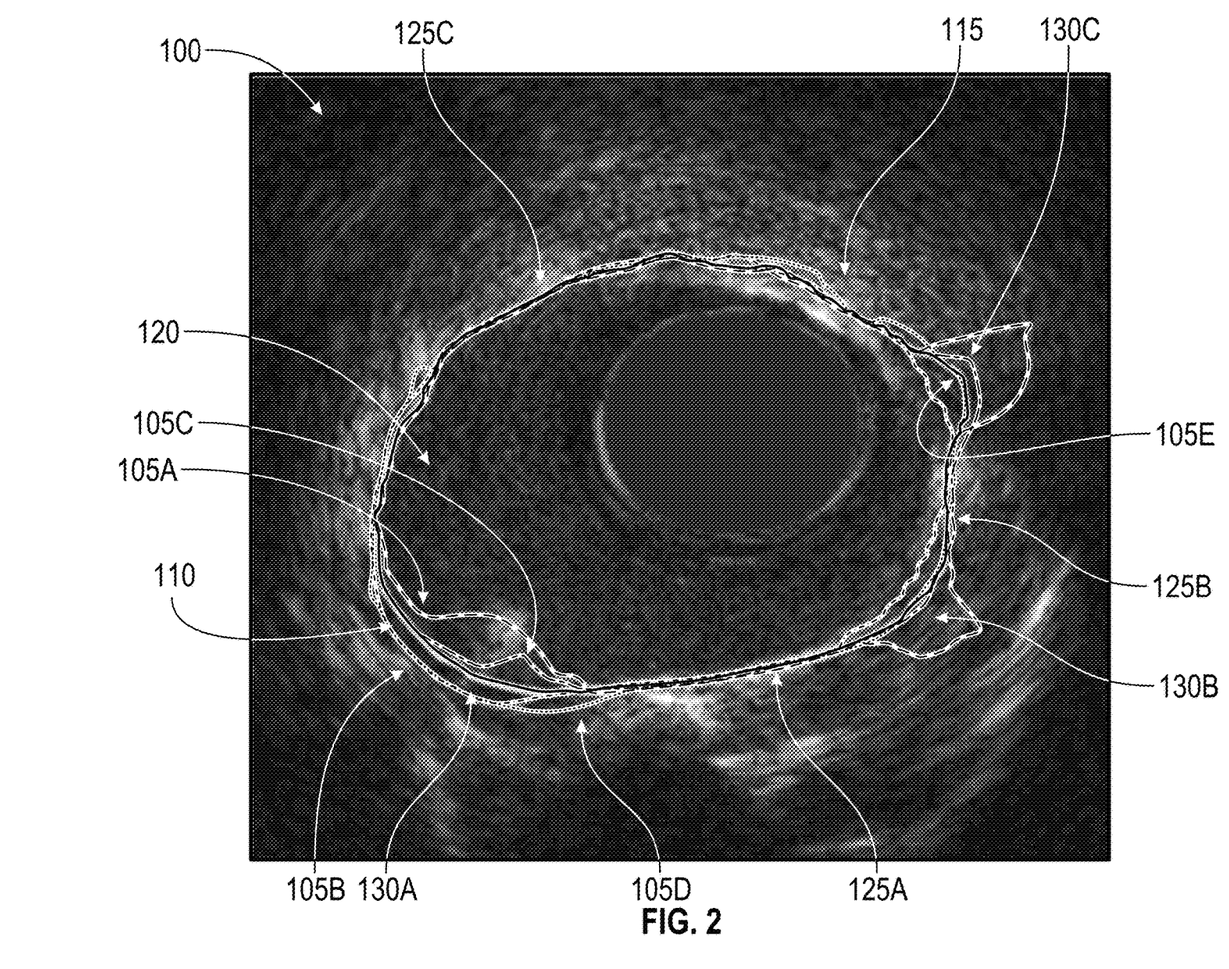
FIG. 2 is an example of a cross-sectional view of a vessel showing a number of exemplary individual segmentation results along with an exemplary collective segmentation result formed from the number of individual segmentation results, in accordance with one or more of the techniques described herein.

FIG. 2 shows an example of a cross-sectional view of a vessel 100. The cross-sectional view of the vessel 100 includes a number of exemplary, individual segmentation results 105A-105E along with an exemplary collective segmentation result 110. The collective segmentation result 110 can be formed from one or more of the individual segmentation results 105A-105E. For example, one or more of the individual segmentation results 105A-105E can be aggregated to form the collective segmentation result 110. In the illustrated example, the collective segmentation result 110 is formed from each of the individual segmentation results 105A-105E. While the illustrated example is described in reference to five individual segmentation results 105A-105E, other numbers of individual segmentation results (e.g., more than five, less than five) can be used on other examples within the scope of the present disclosure.

As shown in FIG. 2, the cross-sectional view of a vessel 100 includes a vessel wall 115 defining a vessel lumen 120. Multiple, independent segmentation operations are performed on the same image data. In this example, multiple, independent segmentation operations are performed on the image data corresponding to the cross-sectional view of a vessel 100. In the illustrated example, the multiple, independent segmentation operations (or models) are carried out to identify/predict an interface, or boundary, between the vessel wall 115 and the vessel lumen 120.

Each of the multiple, independent segmentation operations can result in an individual segmentation result. In the illustrated example, each independent segmentation operation produces a corresponding individual segmentation result 105A-105E. For instance, a first segmentation operation can produce a first individual segmentation result 105A, a second segmentation operation can produce a second individual segmentation result 105B, a third segmentation operation can produce a third individual segmentation result 105C, a fourth segmentation operation can produce a fourth individual segmentation result 105D, and a fifth segmentation operation can produce a fifth individual segmentation result 105E. Each segmentation operation can be different. For instance, in the illustrated example, each segmentation operation may be a different segmentation algorithm for identifying the interface between the vessel wall 115 and the vessel lumen 120. And, each of the different segmentation algorithms can be carried out on the same image data corresponding to the cross-sectional view of a vessel 100. Consequently, each of the individual segmentation results 105A-105E produced by these different segmentation operations may include one or more regions with a similar location to that of the others and one or more regions with a substantially different location to that of the others in approximating the interface between the vessel wall 115 and the vessel lumen 120.

As shown in FIG. 2, the cross-sectional view of a vessel 100 can include one or more regions 125A, 125B, 125C where the individual segmentation results 105A-105E identify a similar location as being the interface between the vessel wall 115 and the vessel lumen 120. At the regions 125A, 125B, and 125C, two or more of the individual segmentation results 105A-105E generally overlap and, therefore, identify a similar location as being the interface between the vessel wall 115 and the vessel lumen 120. For instance, as shown in FIG. 2, at each of the regions 125A, 125B, and 125C, two or more of (e.g., each of) the individual segmentation results 105A-105E are within a predetermined range of one another and, thus, are considered to generally overlap and identify a similar location as being the interface between the vessel wall 115 and the vessel lumen 120.

As also shown in FIG. 2, the cross-sectional view of a vessel 100 can include one or more regions 130A, 130B, 130C where the individual segmentation results 105A-105E identify a substantially different location as being the interface between the vessel wall 115 and the vessel lumen 120. At the regions 130A, 130B, and 130C, two or more of the individual segmentation results 105A-105E generally diverge and, therefore, identify a substantially different location as being the interface between the vessel wall 115 and the vessel lumen 120. For instance, as shown in FIG. 2, at each of the regions 130A, 130B, and 130C, two or more of (e.g., each of) the individual segmentation results 105A-105E are outside of a predetermined range of one another and, thus, are considered to generally diverge and identify a substantially different location as being the interface between the vessel wall 115 and the vessel lumen 120.

As noted, two or more of the individual segmentation results 105A-105E can be used to form the collective segmentation result 110. For instance, two or more of the individual segmentation results 105A-105E can be aggregated to form the collective segmentation result 110. In the illustrated example, a median ensemble of the individual segmentation results 105A-105E was used to form the collective segmentation result 110 shown in FIG. 2. In some examples, each of the individual segmentation results 105A-105E can be used to form the collective segmentation result 110. In other examples, one or more outlier individual segmentation results 105A-105E can be discarded and the remaining individual segmentation results 105A-105E can be used to form the collective segmentation result 110. For example, where one individual segmentation result differs from each of the other individual segmentation results beyond a predetermined outlier threshold, this individual segmentation result can be excluded from use in the formation of the collective segmentation result 110. In some examples, where a portion of an individual segmentation result differs from corresponding portions of the other individual segmentation results beyond a predetermined outlier threshold, this portion of the individual segmentation result can be excluded from use in the formation of the collective segmentation result 110 (e.g., such that the corresponding portion of the collective segmentation result 110 is formed from the corresponding, non-outlier portions of the other individual segmentation results).

Figure 3:
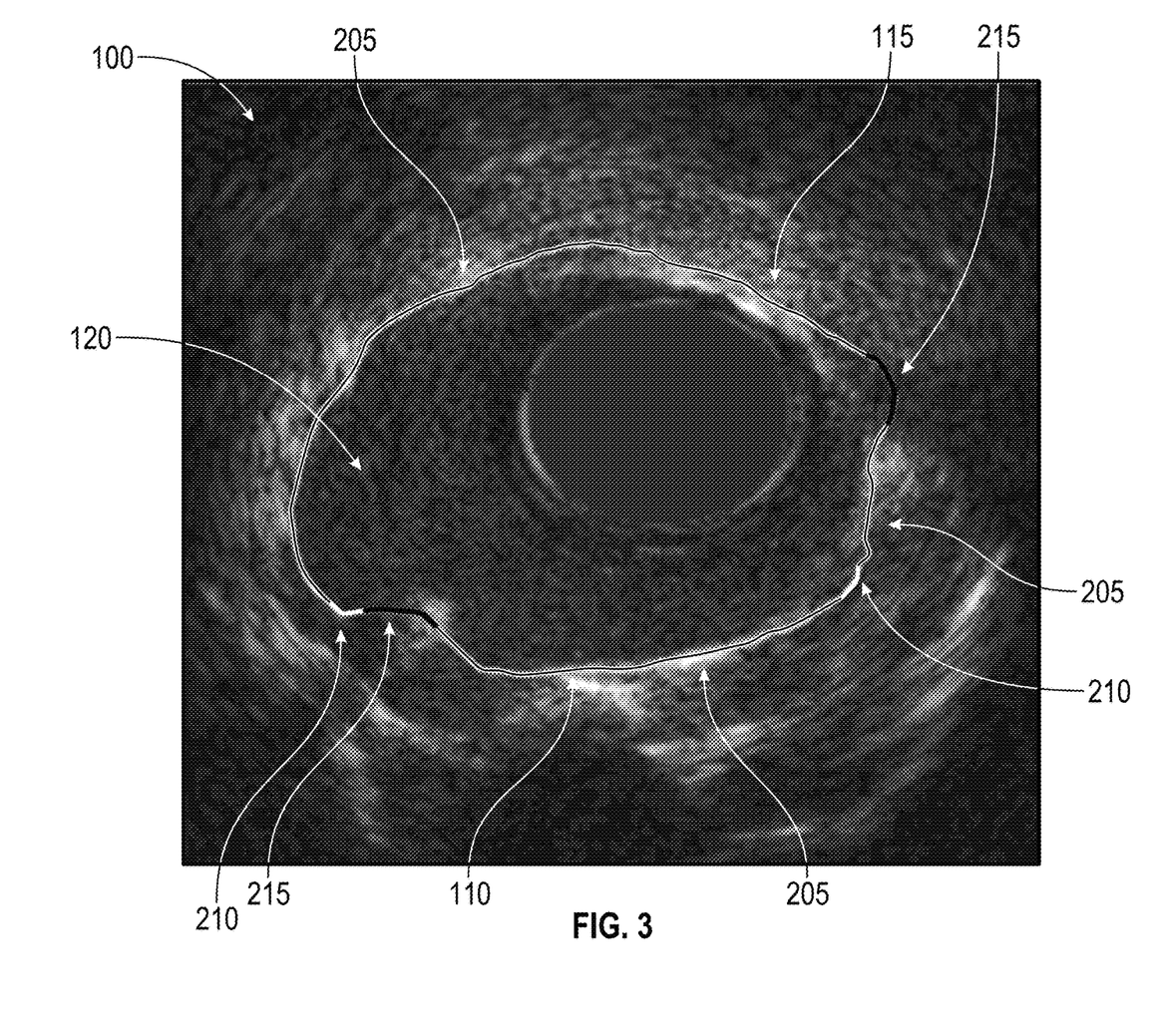
FIG. 3 is an example of a cross-sectional view of the vessel in FIG. 2 with the exemplary collective segmentation result having an associated confidence level in accordance with one or more of the techniques described herein.

FIG. 3 shows an example of the cross-sectional view of the vessel 100 including the collective segmentation result 110 presented with an associated confidence level. As shown in FIG. 3, the collective segmentation result 110 is presented with an associated confidence level by including different indicators at areas of the collective segmentation result 110 where different probabilities of error in the location of the collective segmentation result 110 are present. In the illustrated example, visual indicators are associated with the collective segmentation result 110 to convey areas of the collective segmentation result 110 where different probabilities of error in the location of the collective segmentation result 110 are present. For example, the collective segmentation result 110 can include one type visual indicator associated with a portion of the collective segmentation result 110 where the probability of error in the location of the collective segmentation result 110 is relatively low and another, different type visual indicator associated with a portion of the collective segmentation result 110 where the probability of error in the location of the collective segmentation result 110 is relatively high.

In the illustrated example, portions of the collective segmentation result 110 include different indicators 205, 210, and 215.

The indicator 205 is associated with portions of the collective segmentation result 110 where the probability of error in the location of the collective segmentation result 110 is relatively low. Where the probability of error in the location of the collective segmentation result 110 is relatively low, the confidence level can be considered relatively high. In the illustrated example, the portions of the collective segmentation result 110 where the probability of error in the location of the collective segmentation result 110 is relatively low, and thus associated with the indicator 205, correspond to the regions 125A, 125B, and 125C in FIG. 2 where the individual segmentation results 105A-105E identify a similar location as being the interface between the vessel wall 115 and the vessel lumen 120.

The indicator 215 is associated with portions of the collective segmentation result 110 where the probability of error in the location of the collective segmentation result 110 is relatively high. Where the probability of error in the location of the collective segmentation result 110 is relatively high, the confidence level can be considered relatively low. In the illustrated example, the portions of the collective segmentation result 110 where the probability of error in the location of the collective segmentation result 110 is relatively high, and thus associated with the indicator 215, correspond to the regions 130A and 130C in FIG. 2 where the individual segmentation results 105A-105E identify a substantially different location as being the interface between the vessel wall 115 and the vessel lumen 120.

In some examples, the indicator 210 can also be included and associated with portions of the collective segmentation result 110 where the probability of error in the location of the collective segmentation result 110 is relatively moderate. Where the probability of error in the location of the collective segmentation result 110 is relatively moderate, the confidence level can be considered relatively moderate. For instance, the indicator 210 may be included and associated with portions of the collective segmentation result 110 where the probability of error in the location of the collective segmentation result 110 is transitioning between relatively high and low probabilities of error. In the illustrated example, the portions of the collective segmentation result 110 where the probability of error in the location of the collective segmentation result 110 is relatively moderate, and thus associated with the indicator 210, can correspond regions in FIG. 2 where the individual segmentation results 105A-105E transition between identifying a substantially different location and a substantially similar location as being the interface between the vessel wall 115 and the vessel lumen 120.

As noted, in the illustrated example, the indicators 205, 210, 215 can be visual indicators presented on the displayed image of the cross-sectional view of the vessel 100. As shown, the indicators 205, 210, 215 can be located on the line representing the collective segmentation result 110. The visual indicators 205, 210, 215 can be different visual indicators, presenting different visual characteristics, so that a user can visually distinguish the portions of the collective segmentation result 110 associated with the different confidence levels (e.g., probabilities of error). For example, the different visual indicators 205, 210, 215 can each be different colors. For instance, the visual indicators 205, 210, 215 can take the form of a color gradient such that the visual indicator 205 is displayed with a first portion of the color gradient (e.g., a generally green spectrum of colors), the visual indicator 210 is displayed with a second, subsequent portion of the color gradient (e.g., a generally yellow spectrum of colors), and the visual indicator 215 is displayed with a third, subsequent portion of the color gradient (e.g., a generally red spectrum of colors). In another instance, the visual indicators 205, 210, 215 can take the form of different line patterns at the line representing the collective segmentation result 110. For example, the different visual indicators 205, 210, 215 can each be different dashed line patterns or a combination of different solid and dashed line patterns so that a user can visually distinguish the portions of the collective segmentation result 110 associated with the different confidence levels (e.g., probabilities of error). The different visual indicators 205, 210, 215 can differ with respect to other visual characteristics.

Various techniques can be utilized to determine a confidence level associated with the collective segmentation result 110. The following describes one particular example for determining a confidence level associated with the collective segmentation result 110. Other techniques can be utilized within the scope of the present disclosure for determining a confidence level associated with the collective segmentation result 110.

One exemplary technique executes multiple, different segmentation algorithms to obtain corresponding individual segmentation results. Then, a clustering metric is applied to these individual segmentation results, and the clustering metric is converted into a problem specific probability measure.

In this exemplary technique, to obtain a cluster, the abilities of ensembled predictions can be leveraged. Ensembling generally means aggregating several models' results (e.g., the individual segmentation results) on the same data (e.g., the image data corresponding to the cross-sectional view of the vessel). Once aggregated, a metric is used to obtain final single result (e.g., the collective segmentation result).

In this exemplary technique, by ensembling results together, several possible boundary locations (e.g., the individual segmentation results) can be obtained along with the final computed boundary (e.g., the collective segmentation result). The more results of a single boundary or nearby boundaries, the higher the confidence that the selected boundary is correct. If most results are different, it can be concluded that those borders are ambiguous from the image data so that the confidence of selecting the correct boundary at the corresponding location is low.

In the ensemble process of the exemplary technique, the image segmentation confidence level can be determined by measuring the spread of each algorithm's result from the consensus of all algorithms (e.g., measuring the spread of each of the individual segmentation results from the collective segmentation result). Any types of measuring the statistical information including each algorithm's result (e.g., and their weighted combinations) and any types of defining the consensus of all algorithms' results can be used for estimating the confidence level.

For example, in this exemplary technique, the measure of clustering can be determined using the standard deviation of the predictions (e.g., the individual segmentation results). A high standard deviation can be correlated to a low confidence, while a low standard deviation can be correlated to a high confidence. In some cases, an outlier point or points, such as from a single individual segmentation result, can be removed to avoid skewing the results because of a small number of bad predictions.

In this exemplary technique, once the standard deviation of the predictions (e.g., the individual segmentation results) is determined, the standard deviation can be converted into a confidence measure. For instance, to do so, a minimum and maximum standard deviation to clip to can be empirically determined. For example, a standard deviation less than one may be considered a perfect prediction, and a standard deviation of more than ten can be considered a complete guess. After clipping to the minimum and maximum standard deviation, the determined standard deviation can be normalized to provide a probability of error. The inverse of this probability of error value can be considered as the confidence level for a correct final computed boundary (e.g., the collective segmentation result).

Such a technique can be useful because it can allow for determining a confidence of a segmentation result (e.g., the collective segmentation result) without comparing individual predictions (e.g., the individual segmentation results) to a ground truth (e.g., without comparing to the actual boundary between two items in image data). While the present disclosure describes this technique in an exemplary intravascular imaging application, the present disclosure can apply to other imaging applications. These other imaging applications may include, for example, magnetic resonance imaging (MM) image data, computed tomography (CT) image data, visible light image data, and thermal image data.

Figure 4:
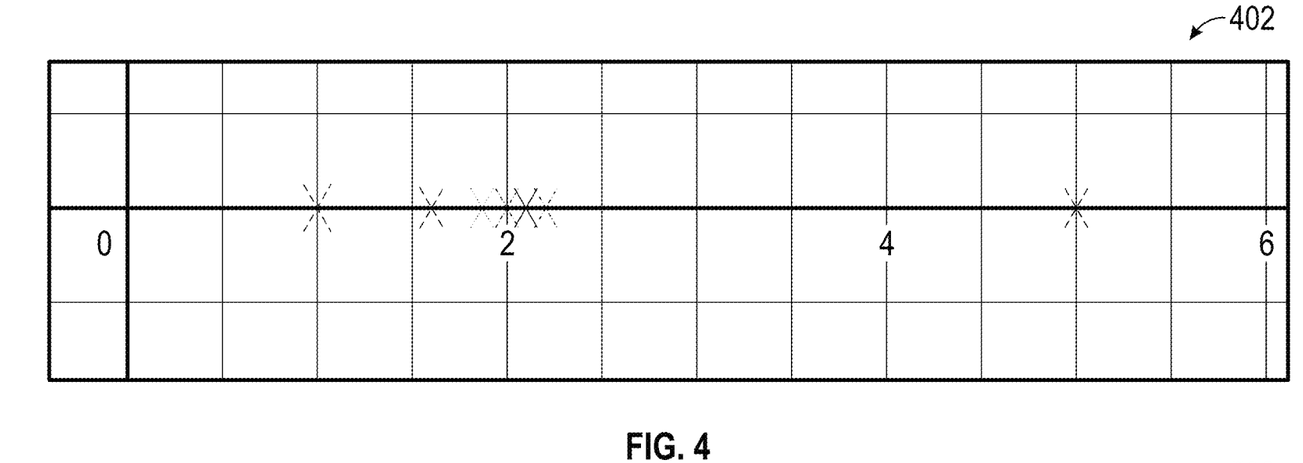
FIG. 4 is a schematic diagram illustrating an example of a method of determining a confidence level using the clustering of individual segmentation results in accordance with one or more of the techniques described herein. The schematic diagram in FIG. 4 illustrates a relatively strong clustering around a particular value.
Figure 5:
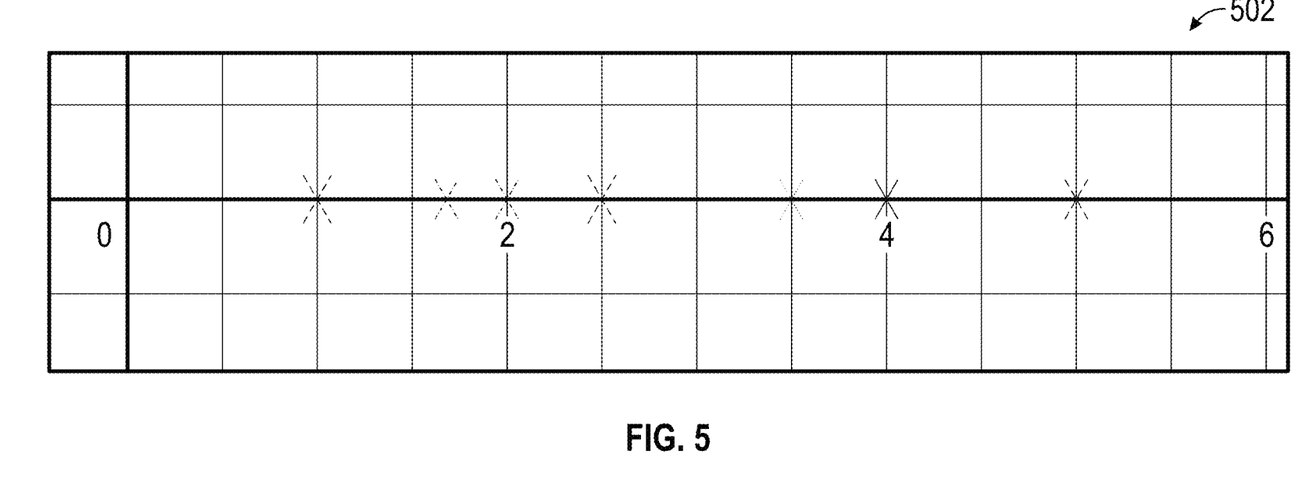
FIG. 5 is another schematic diagram illustrating the example of the method of determining a confidence level using the clustering of individual segmentation results. The schematic diagram in FIG. 5 illustrates a lack of a strong clustering around any particular value.

FIGS. 4 and 5 illustrate schematic diagrams of an example of a method of determining a confidence level using clustering of individual segmentation results. The schematic diagram in FIG. 4 illustrates a relatively strong clustering around a particular value, while the schematic diagram in FIG. 5 illustrates a wider distribution with a lack of a strong clustering around any particular value. In the example shown in FIGS. 4 and 5, the method is attempting to predict a value located at 2, and each point plotted in FIGS. 4 and 5 represents an independent prediction (e.g., an individual segmentation result) from the ensemble.

As shown in FIG. 4, most predictions (e.g., an individual segmentation results) are relatively accurate while a single prediction, shown at approximately a value of 5 is relatively inaccurate, as it much further from the value of 2 than any of the other predictions. Accordingly, in the example of FIG. 4, there is a relatively strong clustering around the value of 2. In one example, the single prediction, shown at approximately a value of 5, can be considered to be an outlier as it falls beyond a predetermined extent from the other predictions and may be excluded from further use. FIG. 4 visually appears to show that, after ensembling, there would be a relatively high confidence level in the prediction of the final value (e.g., the collective segmentation result).

As shown in FIG. 5, the individual predictions (e.g., the individual segmentation results) are relatively spread out and, as such, a confidence level in any single prediction is relatively low. In this example, no strong clustering around a particular value is present. Thus, after ensembling, it can be determined that there is a relatively low confidence value associated with the individual predictions shown here.

As illustrated in the examples shown in FIGS. 4 and 5, evaluating the prediction clustering can have a strong correlation with the confidence level of the prediction in the absence of a ground truth (e.g., in these examples, not knowing the true value to be 2). The prediction clustering can be evaluated using any general clustering metric, such as a standard deviation as described elsewhere herein.

To turn a clustering metric into a confidence level, a mapping can be determined between the clustering metric and a probability. In many instances, the relationship between the clustering metric and error can be systematically estimated as suited for a particular application. Using the example of standard deviation, an appropriate standard deviation can be experimentally chosen to account for most clustering errors. After establishing such relationship, a mapping can be approximated as suitable to various applications. For instance, one example mapping can be a simple normalization metric after experimentally determining a maximum allowable standard deviation, as detailed previously herein. Such mapping can be made nonlinear if applicable to the specific application.

Figure 6:
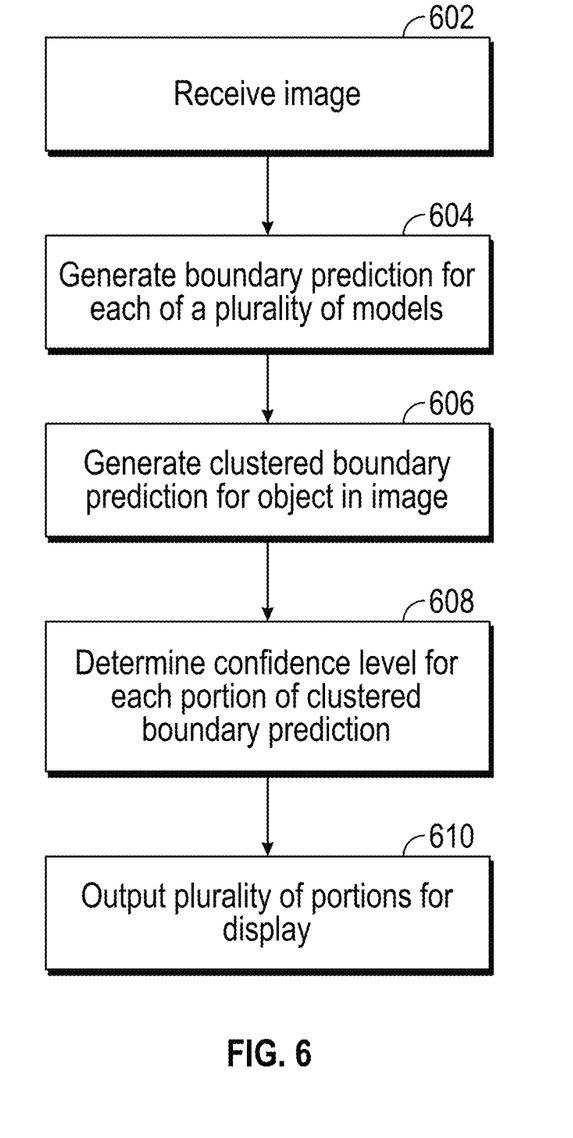
FIG. 6 is a flow diagram illustrating an example process of predicting a clustered boundary of an object within an image in accordance with one or more of the techniques described herein.

FIG. 6 is a flow diagram illustrating an example process of predicting a clustered boundary of an object within an image in accordance with one or more of the techniques described herein. The operations of FIG. 6 may be performed by one or more processors of a computing device, such as computing device 2 of FIG. 1. For purposes of illustration only, FIG. 6 is described below within the context of computing device 2 of FIG. 1.

In accordance with the techniques of this disclosure, computing device 2 receives an image comprising a cross-sectional view of an object (602). For each of a plurality of models, computing device 2 generates, using the respective model, a boundary prediction for the object within the image (604). Each model of the plurality of models is a unique model. Further, each boundary prediction has a plurality of boundary prediction portions. Computing device 2 generates, based on the boundary prediction for each model of the plurality of models, a clustered boundary prediction for the object within the image (606). The clustered boundary prediction includes a plurality of clustered boundary prediction portions that each correspond to one of the plurality of boundary prediction portions of each of the boundary predictions. For each of the plurality of clustered boundary prediction portions, computing device 2 determines, based on a comparison between the respective clustered boundary prediction portion and the corresponding boundary prediction portions of the boundary predictions, a confidence level for the respective clustered boundary prediction portion (608). Computing device 2 outputs, for display on a display device, a graphical indication for each of the plurality of clustered boundary prediction portions (610). Each clustered boundary prediction portion has a visual characteristic indicative of the confidence level for the respective clustered boundary prediction portion.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described with reference to certain disclosed examples. The examples are presented for purposes of illustration and not limitation. One skilled in the art will appreciate that various changes, adaptations, and modifications can be made without departing from the scope of the invention.

What is claimed is:

1. A method comprising:
   receiving, by a processor, an image comprising a cross-sectional view of an object;
   for each of a plurality of models, generating, by the processor and using the respective model, a boundary prediction for the object within the image, wherein each boundary prediction comprises a plurality of boundary prediction portions and each model of the plurality of models comprises a unique model;
   generating, by the processor, and based on the boundary prediction for each model of the plurality of models, a clustered boundary prediction for the object within the image, the clustered boundary prediction comprising a plurality of clustered boundary prediction portions that each correspond to one of the plurality of boundary prediction portions of each of the boundary predictions;
   for each of the plurality of clustered boundary prediction portions, determining, by the processor, and based on a comparison between the respective clustered boundary prediction portion and the corresponding boundary prediction portions of the boundary predictions, a confidence level for the respective clustered boundary prediction portion; and
   outputting, by the processor and for display on a display device, a graphical indication for each of the plurality of clustered boundary prediction portions, wherein each clustered boundary prediction portion has a visual characteristic indicative of the confidence level for the respective clustered boundary prediction portion.

2. The method of claim 1, wherein the plurality of models includes one or more of a machine learning model, a deep learning model, a pattern recognition model, a computer vision model, and a parameter-modified model.

3. The method of claim 1, wherein determining the confidence level comprises:
   for each of the plurality of models, determining, by the processor, and based on a comparison between the respective clustered boundary prediction portion and the corresponding boundary prediction portions of the boundary predictions, a spread for the respective model; and
   determining, by the processor and based on the spread for each of the corresponding boundary prediction portions of the boundary predictions, the confidence level for the respective clustered boundary prediction portion.

4. The method of claim 3, wherein determining the spread for each of the corresponding boundary prediction portions of the boundary predictions comprises:
creating, by the processor and using the clustered boundary prediction portions and each of the corresponding boundary prediction portions of the boundary predictions, a prediction distribution with the clustered boundary prediction portions as a mean of the prediction distribution;
determining, by the processor, a standard deviation for each of the corresponding boundary prediction portions of the boundary predictions; and
determining, by the processor, a z-score for each of the corresponding boundary prediction portions of the boundary predictions as a number of standard deviations away the respective corresponding boundary prediction portion is from the clustered boundary prediction.

5. The method of claim 3, further comprising:
determining, by the processor, that the spread for a first corresponding boundary prediction portion of a first boundary prediction exceeds a deviation threshold for the prediction distribution, the first boundary prediction being associated with a first model of the plurality of models;
removing, by the processor, the first model from the plurality of models to generate a subset of models; and
re-calculating, by the processor, at least the respective clustered boundary prediction portion using only the subset of models.

6. The method of claim 5, wherein the deviation threshold comprises one of a user-defined threshold or a default threshold.

7. The method of claim 1, wherein the visual characteristic comprises one or more of a line color, a fill pattern, a line weight, a line segmentation, a textual indication, or a graphical icon.

8. The method of claim 1, further comprising:
for each of the plurality of models, determining, by the processor, a weight for the respective model; and
generating, by the processor, and based on the corresponding boundary prediction portions of the boundary predictions and the weight for each model of the plurality of models, the clustered boundary prediction as a weighted clustered boundary prediction for the object within the image.

9. The method of claim 1, wherein the plurality of models comprises three or more distinct models.

10. A computing device comprising:
at least one processor; and
a storage component configured to store instructions executable by the at least one processor to:
receive an image comprising a cross-sectional view of an object;
for each of a plurality of models, generate, using the respective model, a boundary prediction for the object within the image, wherein each boundary prediction comprises a plurality of boundary prediction portions and each model of the plurality of models comprises a unique model;
generate, based on the boundary prediction for each model of the plurality of models, a clustered boundary prediction for the object within the image, the clustered boundary prediction comprising a plurality of clustered boundary prediction portions that each correspond to one of the plurality of boundary prediction portions of each of the boundary predictions;
for each of the plurality of clustered boundary prediction portions, determine, and based on a comparison between the respective clustered boundary prediction portion and the corresponding boundary prediction portions of the boundary predictions, a confidence level for the respective clustered boundary prediction portion; and
output, for display on a display device, a graphical indication for each of the plurality of clustered boundary prediction portions, wherein each clustered boundary prediction portion has a visual characteristic indicative of the confidence level for the respective clustered boundary prediction portion.

11. The computing device of claim 10, wherein the plurality of models includes one or more of a machine learning model, a deep learning model, a pattern recognition model, a computer vision model, and a parameter-modified model.

12. The computing device of claim 10, wherein the instructions executable by the one or more processors to determine the confidence level comprise instructions executable by the one or more processors to:
for each of the plurality of models, determine, based on the comparison between the respective clustered boundary prediction portion and the corresponding boundary prediction portions of the boundary predictions, a spread for the respective model; and
determine, based on the spread for each of the corresponding boundary prediction portions of the boundary predictions, the confidence level for the respective clustered boundary prediction portion.

13. The computing device of claim 12, wherein the instructions executable by the one or more processors to determine the spread for each of the corresponding boundary prediction portions of the boundary predictions comprise instructions executable by the one or more processors to:
create, using the clustered boundary prediction portions and each of the corresponding boundary prediction portions of the boundary predictions, a prediction distribution with the clustered boundary prediction portions as a mean of the prediction distribution;
determine a standard deviation for each of the corresponding boundary prediction portions of the boundary predictions; and
determine a z-score for each of the corresponding boundary prediction portions of the boundary predictions as a number of standard deviations away the respective corresponding boundary prediction portion is from the clustered boundary prediction portion.

14. The computing device of claim 12, wherein the instructions are further executable by the one or more processors to:
determine that the spread for a first corresponding boundary prediction portion of a first boundary prediction exceeds a deviation threshold for the prediction distribution, the first boundary prediction being associated with a first model of the plurality of models;
remove the first model from the plurality of models to generate a subset of models; and
re-calculate at least the respective clustered boundary prediction portion using only the subset of models.

15. The computing device of claim 14, wherein the deviation threshold comprises one of a user-defined threshold or a default threshold.

16. The computing device of claim 10, wherein the visual characteristic comprises one or more of a line color, a fill pattern, a line weight, a line segmentation, a textual indication, or a graphical icon.

17. The computing device of claim 10, wherein the instructions are further executable by the one or more processors to:
for each of the plurality of models, determine a weight for the respective model; and
generate, based on the corresponding boundary prediction portions of the boundary predictions and the weight for each model of the plurality of models, the clustered boundary prediction as a weighted clustered boundary prediction for the object within the image.

18. The computing device of claim 10, wherein the plurality of models comprises three or more distinct models.

19. The computing device of claim 10, further comprising a camera configured to capture the image.

20. A non-transitory computer-readable storage medium is described having stored thereon instructions that, when executed, cause one or more processors of a computing device to:
receive an image comprising a cross-sectional view of an object;
for each of a plurality of models, generate, using the respective model, a boundary prediction for the object within the image, wherein each boundary prediction comprises a plurality of boundary prediction portions and each model of the plurality of models comprises a unique model;
generate, based on the boundary prediction for each model of the plurality of models, a clustered boundary prediction for the object within the image, the clustered boundary prediction comprising a plurality of clustered boundary prediction portions that each correspond to one of the plurality of boundary prediction portions of each of the boundary predictions;
for each of the plurality of clustered boundary prediction portions, determine, and based on a comparison between the respective clustered boundary prediction portion and the corresponding boundary prediction portions of the boundary predictions, a confidence level for the respective clustered boundary prediction portion; and
output, for display on a display device, a graphical indication for each of the plurality of clustered boundary prediction portions, wherein each clustered boundary prediction portion has a visual characteristic indicative of the confidence level for the respective clustered boundary prediction portion.

* * * * *